Figure 1:
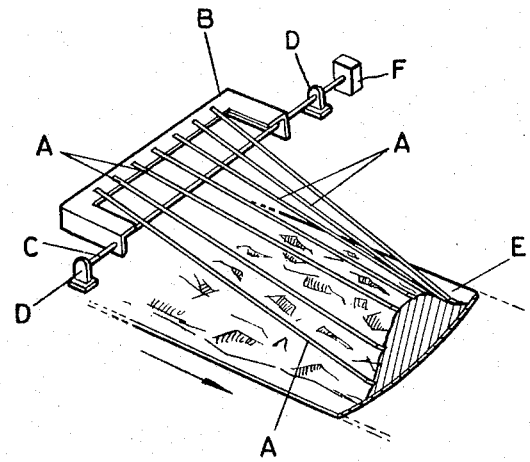

Jan. 3, 1967   G. HILLYAR-RUSS ET AL   3,295,213

APPARATUS FOR MEASURING THE FLOW OF MATERIAL

Filed Aug. 11, 1964

Inventors
Geoffrey Hillyar-Russ
Michael Newman
By Stevens, Davis, Miller & Mosher
Attorneys

United States Patent Office 3,295,213
Patented Jan. 3, 1967

3,295,213
APPARATUS FOR MEASURING THE FLOW
OF MATERIAL
Geoffrey Hillyar-Russ, Woodville, near Borton-on-Trent, and Michael Newman, Mickleover, Derbyshire, England, assignors to Coal Industry (Patents) Limited, London, England, a company of Great Britain
Filed Aug. 11, 1964, Ser. No. 388,876
1 Claim. (Cl. 33—121)

This invention relates to apparatus of the kind which is responsive to variations in volumes of loose solid material travelling past the apparatus.

An example of a known apparatus of the kind referred to comprises a swinging flap arranged over a conveyor belt so that it is deflected by material on the conveyor belt; as the volume of material on the conveyor belt below the flap varies the flap moves, and its movements are employed for regulating devices which may indicate and/or record the quantity of material being conveyed or vary the speed of the conveyor belt or produce a warning signal. Such an apparatus has various disadvantages, for example the flap may bounce on the material and variations in the manner in which the material is distributed across the width of the conveyor belt may lead to substantial error when recording quantities.

The present invention is therefore intended to provide an improved apparatus of the kind referred to.

According to the invention an apparatus of the kind referred to comprises a plurality of individual sensing elements arranged to be deflected by passing material, and means for combining signals derived from the deflections of said individual sensing elements to produce a resultant signal. The sensing elements may be in the form of strips arranged side-by-side and located along the direction of travel of the material. Preferably the strips are arranged so that their ends remain in contact either with the supporting surface for the material when in their non-deflected position or in contact with the surface of the passing material when in their deflected position. The strips may be spaced equally from one another or be disposed in a pattern whereby the spacing and/or the relative flexibility of the strips is related to an appropriate mathematical rule. The means for combining signals, the latter being forces or movements derived from the sensing elements, may comprise a pivoted frame having the said elements attached thereto, said frame being adapted to receive from each sensing element a force proportional to the deflection of the sensing element whereby the frame is subjected to a resultant torque or turning movement may, for example, be employed for regulating devices for indicating and/or recording the quantity of passing material. Further features of the invention appear from the following description and the accompanying drawing.

Figure 2:
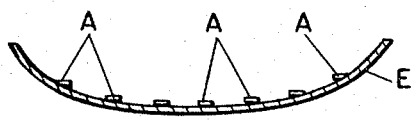
Figure 3:
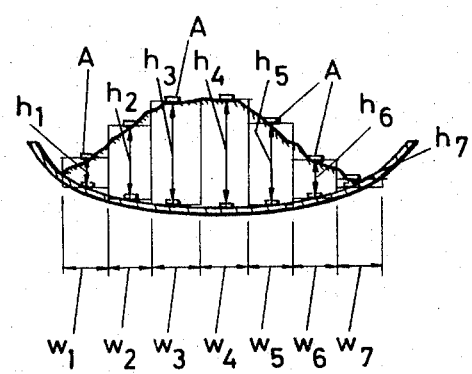

The invention is illustrated by way of example in the accompanying drawing, in which:

FIGURE 1 is a perspective view of an apparatus according to the invention, for use in indicating the quantity of material such as coal upon a belt conveyor, and FIGURES 2 and 3 are somewhat diagrammatic cross-sectional views showing respectively conditions below the apparatus when the belt is empty and when the belt is loaded.

The illustrated apparatus comprises a plurality of sensing elements or fingers A which are substantially identical and are attached each at one end to a frame B so that they are parallel and equally spaced. The other ends of the fingers A are arranged to rest upon the surface of the material on a conveyor belt E, or upon the surface of the belt E itself when it is empty. The frame B is attached to a shaft C which is at right-angles to the fingers A and to the direction of motion of the belt E. The fingers A are inclined with respect to the surface of the belt E, and their tips are bent or curved to conform roughly with the surface of the belt E. The pivoting of the frame B and shaft C is in virtually frictionless bearings D, and the centre of gravity of the frame B and fingers A is arranged so that the fingers A rest with their tips on the surface of the material or of the empty belt. The fingers A are designed to be so flexible and/or are attached to the frame B in such a flexible manner that without exceeding the elastic limit of the material of which the fingers A are constructed or by means of which they are attached to the frame B, all the fingers will remain in contact with the surface of the material, or of the empty belt, no matter what cross-section the material passing the fingers may, from moment to moment, adopt, and no matter what the profile of the empty belt may be.

In FIGURE 3 the dimensions $h_1$, $h_2$, $h_3$, etcetera represent the displacements of the tips of the fingers brought about by the presence of the material.

In FIGURES 2 and 3 it will be seen that the fingers A are distributed across the conveyor and it may be considered that each finger is resting upon an element of a width $w_1$, $w_2$, $w_3$ etcetera and that a close approximation to the actual cross-sectional area of material passing at the instant depicted will be given by the sum of the rectangular elements $h_1$, $w_1+h_2$, $w_2+h_3$, $w_3$ etcetera. Also as the finger tips are distributed at equal distances from each other, the sum of the displacements $h_1+h_2+h_3$ etcetera will be approximately proportional to the cross-sectional area of the material passing.

Now a displacement of the tip of any finger A will create a torque on the frame B, and as the fingers A are not stressed beyond their elastic limit, this torque will be proportional to the degree of that displacement. But as the frame B is mounted on a shaft C in substantially frictionless bearings, the torques created by the flexing of the various fingers will cause the frame B to turn about the axis of the shaft C until the resultant torque is zero. The extent by which the frame B is tilted is conveniently indicated by an indicator means F. It may be established that the angle through which the frame B turns in response to the presence of material on the conveyor will be approximately proportional to the cross-sectional area of the material on the conveyor if either:

(a) The fingers are substantially similar, and their tips are distributed at equal intervals across the width of the conveyor, or of that part of the conveyor carrying material, or (b) The tips of the fingers are distributed across the width of the conveyor or of that part of the conveyor carrying material in any convenient manner and the stiffness of each finger is made proportional to that width, $w_1$, $w_2$, $w_3$, etcetera of the element of conveyor width upon which it is considered to rest. Moreover, since the zero of the device is set at the position adopted by the frame when the fingers are resting upon the empty belt, this remains true regardless of the cross-sectional profile of the empty belt or of the material passing. Also, insofar as the speed of the belt is constant, this displacement will be proportional to the volumetric rate of passage of the material.

In the foregoing description the words "conveyor" or "belt" have been used for brevity and convenience, but the apparatus may be used to measure or determine the rate of passage of any loose solid material at any point or position where it is moving at a linear rate which is either constant, or fairly constant, or known or approximately known. Conveying devices where these conditions apply, include, amongst others, belt conveyors, scraper conveyors, worm conveyors, vibratory conveyors, feeders, rolls, extruding devices, rotating tables, or vibrating screens.

The tips of the fingers A may be disposed across the width of the conveyor, or of that portion of the conveyor carrying material, in any convenient manner. For example, the fingers may be spaced from 2 to 6", preferably 4", across the width of the belt. The flexibility of the individual fingers A or of the method of attachment of the individual fingers to the frame B may be arranged to vary in relation to the spacing of the tip of each finger from the tip or tips of the finger or fingers adjacent to it. The movements of the frame B may be used to indicate the rate of passage of material on the conveyor, or when material is passing at any particular rate or rates, for example by means of and in conjunction with suitable mechanical, electrical, magnetic, pneumatic or hydraulic attachments, locally and/or at a remote point or points. The movements of the frame B or shaft C may also be used to indicate the amount of material which has passed during a desired period, or when any desired amount or amounts has passed, or to control quantity of material passing on to/along/or from the conveyor, or to control the quantity of material passing on to/along/or from another conveyor or conveyors, or to control the operating settings or conditions in any process which is treating the material before or during or after passing along the conveyor.

Various modifications may be introduced without departing from the invention, and the apparatus may be designed to give satisfactory indications with approximations according to various mathematical rules, for example Simpson's rule, or the "mid-ordinate" rule, or the "trapezoidal" rule whereby the spacing and/or the flexibility of the elements is determined.

From the above description it will be seen that the invention provides an improved apparatus capable of satisfactory employment in a wide variety of circumstances.

We claim:

Apparatus responsive to variations in volume of material transported in a predetermined direction past the apparatus, comprising a plurality of individual strip-like elements, a support means to which said elements are attached so that they extend in the same direction in side-by-side relationship, and are separately flexible relative to the support means, a free end of each said element adapted for contacting said material, means for mounting the support frame for pivotal movement about an axis transverse to said direction so that said elements extend in said direction with the free ends positioned to be contactable and deflectable by the material whereby each element on deflection can exert a torque on the support means thereby to cause the latter to pivot, and means for providing an indication of the extent of pivotting of the support means.

References Cited by the Examiner

UNITED STATES PATENTS

| | | |
|---|---|---|
| 1,773,816 | 8/1930 | Lea. |
| 2,312,216 | 2/1943 | Keeler _____ 73—228 X |
| 2,642,664 | 6/1953 | Wilson et al. |
| 3,075,289 | 1/1963 | Schreuder et al. _____ 33—121 |

FOREIGN PATENTS

| | | |
|---|---|---|
| 33,162 | 6/1912 | Sweden. |
| 546,843 | 8/1956 | Italy. |

RICHARD C. QUEISSER, *Primary Examiner.*

E. D. GILHOOLY, *Assistant Examiner.*